United States Patent
Luo

(10) Patent No.: US 7,920,582 B2
(45) Date of Patent: Apr. 5, 2011

(54) MEDIA GATEWAY FOR REPORTING EVENTS AND METHOD FOR REPORTING EVENTS BY MEDIA GATEWAY IN A NEXT GENERATION NETWORK

(75) Inventor: Zhong Luo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 443 days.

(21) Appl. No.: 11/976,034

(22) Filed: Oct. 19, 2007

(65) Prior Publication Data

US 2008/0080541 A1 Apr. 3, 2008

Related U.S. Application Data

(63) Continuation of application No. PCT/CN2006/000740, filed on Apr. 20, 2006.

(30) Foreign Application Priority Data

Apr. 20, 2005 (CN) .......................... 2005 1 0034335
Oct. 11, 2005 (CN) .......................... 2005 1 0113025

(51) Int. Cl.
*H04L 12/26* (2006.01)
(52) U.S. Cl. .................. 370/410; 370/254; 370/352
(58) Field of Classification Search .................. 370/352, 370/236, 410
See application file for complete search history.

(56) References Cited

U.S. PATENT DOCUMENTS

| 6,674,713 B1 * | 1/2004 | Berg et al. ..................... 370/217 |
| 6,915,421 B1 * | 7/2005 | Kalmanek Jr. et al. ....... 713/153 |
| 7,103,033 B2 * | 9/2006 | Gao ............................. 370/352 |
| 2002/0130834 A1 | 9/2002 | Madarasz et al. |
| 2006/0165015 A1 * | 7/2006 | Melick et al. ................. 370/254 |

FOREIGN PATENT DOCUMENTS

CN 1394051 A 1/2003
(Continued)

OTHER PUBLICATIONS

Lin et al.; "A Proposal to Introduce an Efficient Mechanism for Eventbuffer Processing"; Huawei Technologies Co., International Telecommunication Union, ITU-I Draft Study Period 2005-2008, Study Group 16-Delayed Contribution 19, 2 pages, (Nov. 16, 2004).

(Continued)

*Primary Examiner* — Dang T Ton
*Assistant Examiner* — Pamit Kaur
(74) *Attorney, Agent, or Firm* — Finnegan, Henderson, Farabow, Garrett & Dunner LLP

(57) ABSTRACT

A method for reporting events by a media gateway in a next generation network includes: executing a state machine which is established in a media gateway and includes service states driven by events, the state machine including a state of Suspension; the executing process includes: entering into the state of Suspension when an event is reported, if the state machine is in a state other than the state of Suspension; and storing an event which can not be reported temporarily in an EventBuffer queue which is established in the media gateway, and returning to a state prior to the state of Suspension when the event reported is responded, if the state machine is in the state of Suspension. A media gateway for reporting events in a next generation network is also disclosed.

23 Claims, 5 Drawing Sheets

FOREIGN PATENT DOCUMENTS

CN    1499802 A    5/2004

OTHER PUBLICATIONS

Lin et al.; "A Rule-Based Method for Higher H.248 Eventbuffer Processing Efficiency"; Huawei Technologies Co., International Telecommunication Union, ITU-I Draft Study Period 2005-2008, Study Group 16-Delayed Contribution 20, 2 pages, (Nov. 16, 2004).
Extended European search report including supplementary European search report and European search opinion from the European Patent Office for European Application No. 06 72 2383, (Apr. 15, 2008).
Written Opinion of the International Searching Authority (translation) dated (mailed) Aug. 10, 2006, issued in related application No. PCT/CN2006/000740, filed Apr. 20, 2006, Huawei Technologies Co., Ltd.
First Chinese Office Action dated (mailed) Feb. 20, 2009, issued in related Chinese application No. 200510113025.3, Huawei Technologies Co., Ltd.
Second Chinese Office Action dated (mailed) Aug. 14, 2009, issued in related Chinese application No. 200510113025.3, Huawei Technologies Co., Ltd.
Third Chinese Office Action dated (mailed) Jan. 8, 2010, issued in related Chinese application No. 200510113025.3, Huawei Technologies Co., Ltd.
Andreasen, F. et al., "Media Gateway Control Protocol (MGCP) Version 1.0", Request for Comments 3435, Network Working Group, The Internet Society (Jan. 2003), 210 pages.
Groves, C. et al., "Gateway Control Protocol Version 1", Request for Comments 3525, Network Working Group, The Internet Society (Jun. 2003), 213 pages.

* cited by examiner

MEDIA GATEWAY FOR REPORTING EVENTS AND METHOD FOR REPORTING EVENTS BY MEDIA GATEWAY IN A NEXT GENERATION NETWORK

CROSS-REFERENCE TO RELATED APPLICATIONS

The present application is a continuation application of PCT application No. PCT/CN2006/000740, filed Apr. 20, 2006, which claims Chinese priorities of No. 200510034335.6, filed Apr. 20, 2005 and No. 200510113025.3, filed Oct. 11, 2005.

FIELD OF THE INVENTION

The present invention relates to the technology of next generation network, and particularly to a method for reporting events by a media gateway in a next generation network.

BACKGROUND OF THE INVENTION

Both Media Gateway Controller (abbreviated as MGC) and Media Gateway (abbreviated as MG) are key components in a Next Generation Network (NGN). The MGC provides call control function, while the MG provides service bearing function, thereby implementing separation between the call control plane and the service bearing plane, sharing network resource efficiently, simplifying upgrading of devices and service expansion, and greatly reducing the costs of network deployment and maintenance.

FIG. 1 illustrates the relation and communication protocols among components of the NGN. In the figure, the core packet network is usually an Internet Protocol (abbreviated as IP) network, which provides the connections between MG and MG as well as the connections between MG and MGC. MG is responsible for enabling a user terminal to access the core network through an access network. The MGC communicates with the MGs using media gateway control protocol, thereby providing the control of MG under MGC and network control function. Communication between MG and MG is adapted for accomplishing the bearing of media streams, and is usually implemented using Real-time Transport Protocol (abbreviated as RTP).

Media gateway control protocol is a major protocol between MG and MGC. At present, two media gateway control protocols are widely used, i.e., H.248 (also called MeGaCo protocol) and Media Gateway Control Protocol (abbreviated as MGCP). The MGCP was published in October 1999 and revised in January 2003 by Internet Engineering Task Force (abbreviated as IETF). H.248 protocol was published in November 2000 and revised on June 2003 by IETF together with International Telecommunication Union (abbreviated as ITU).

In H.248 protocol, MGs bear traffic through resources in the MGs. Various resources in MGs are abstracted as terminations. The terminations are categorized into two major classes: physical terminations and ephemeral terminations. The former represents some semi-permanent physical entities, such as Time Division Multiplexing (abbreviated as TDM) channels. The latter represents some public resources that are obtained on request temporarily and then released after being used, such as RTP streams. Any combination of different terminations is abstracted as context. A context may include multiple terminations. And the relationship among terminations may be described in terms of topology. Based on such an abstract model, the call control may be indeed described as various operations and processing on terminations and contexts.

In the media gateway protocol communication, MGCs interact with MGs through commands. Each command carries parameters that are categorized into signals, events, etc. A signal is used by MGCs to instruct MGs to perform operations on resources, such as send dial tone, ring-back tone, or busy tone to a subscriber. The events are used by MGCs to instruct MGs to perform state monitoring, such as monitoring of off-hook, hang-up, dialing, and flash-hook of a subscriber.

Commands such as signals and events contain various control details of MGs in call proceedings and operations on resources. Therefore, the commands should be executed in strict sequence. However, the uncertainty and lack of reliability of IP networks may result in out-of-order transmission of commands and even the loss of commands, which may bring severe errors. Therefore, in the media gateway protocol communication, a mechanism should be adopted to ensure that commands can be transmitted and executed in sequence.

In H.248 protocol, a mechanism called transaction has been adopted for the transmission and execution of commands. Correlation of commands is defined with transaction, i.e. commands within a transaction are executed in sequence, while commands within different transactions may be executed in parallel. In addition, the execution sequence of commands within different transactions follows the rules as follows:

Rule 1: Commands addressed to different terminations may be sent in parallel.

Rule 2: For transmission without an ensured transmission sequence, e.g. User Datagram Protocol (abbreviated as UDP), there should be at most one unfinished command of Notify in H.248 protocol in one termination.

Rule 3: An AuditValue command in H.248 protocol is not limited to any sequence.

Rule 2 ensures that operations on a termination can be performed in sequence. Because each command must be responded with a Notify, Rule 2 also ensures that the next command will not be executed until the current command is responded. The AuditValue command is a special command for returning a current state of termination characteristic and has no conflict with any other operation. Therefore Audit Value command is not limited to any sequence.

Based on the above three rules, a receiver of a command is a separate executing unit in terms of transaction. If there are multiple commands within a transaction, the commands should be executed in sequence. However, commands between different transactions may be executed in a sequence of reception or executed in parallel by ignoring the sequence. Therefore, if there is a correlation among commands, a command sender must effectively ensure the executed sequence of commands at a receiver in accordance with a rule.

When an MGC sends a command to an MG, MGC should ensure that there is at most one unfinished command (Add, Modify or Move) in H.248 protocol in one termination. For MGC capable of controlling a call proceeding, the next command is sent after a previous command is responded. Therefore, viewed from the command sent from MGC to MG, MGC can realize the control of sending sequence of events without a complex mechanism.

However, for MG, it should be ensured that there is at most one unfinished command of Notify in H.248 protocol in one termination when MG reports events to MGC. Most of the information that is reported to MGC by MG is users' operations, such as off-hook, hang-up, dialing and flash-hook in voice service. Because users' operations are usually random, MG should establish a more complex mechanism than that of MGC to ensure that the commands from MG itself can be executed in MGC serially without producing any out-of-order fact. The mechanism for implementing sequential report of events at MG is called Light Weight State Machine.

The method of reporting events by MG is a key issue, a hot issue and also a difficult issue at present in NGN network technology.

At present, in the art, there are mainly two technical solutions for addressing the issue of processing events reported by MG. One is a technology based on reliable transmission protocol, and the other is a technology based on control by MGC.

The first solution adopts transmission protocols based on reliable connection, such as Transfer Control Protocol (abbreviated as TCP) and Stream Control Transmission Protocol (abbreviated as SCTP), to ensure the sequential and serial transmission of commands, so that it can be ensured that a receiver can perform sequential execution due to the sequential transmission at a sender. An application layer of the sender only needs to deliver a command message to be sent to a transmission layer, so that the reliability mechanism of transmission protocols is adopted to ensure that each message can reach the receiver sequentially. Before the previous command is responded, a subsequent command will be buffered in a sending queue of the transmission layer. In such a manner, the mechanism of buffering at the transmission layer and serial sending of commands can achieve the object of serial execution of commands.

The first solution, by adopting the transmission protocols based on reliable connection, can avoid out-of-order execution of commands due to transmission, but at the same time the first solution limits the transmission protocol that can be selected by the application. Particularly, this solution is not adapted for such an environment in which unreliable connection should be widely used. In addition, the reliability mechanism of the transmission protocols will reduce the transfer rate of messages, and thereby resulting in a reduced interacting efficiency of commands definitely.

The other solution based on MGC control adopts an EventBuffer mechanism to ensure the commands as serial, i.e. if a termination does not receive a response of Notify in response to an event report, subsequent events detected are temporarily buffered in a First In First Out (abbreviated as FIFO) queue established for this termination based on certain selection conditions, and the terminal selects the comments from the queue for report in accordance with certain conditions after receiving a response to the previous event, while those comments that can not meet the selection conditions will be discarded. However, H.248 protocol adopts Events Descriptor to set report conditions of the events, adopts EventBuffer Descriptor to set buffer conditions of the events, and adopts EventBufferControl property to control the FIFO queue for buffering events to be off or to perform a one-time selection and event report (LockStep) in accordance with the conditions of Events Descriptor. Therefore, the procedure of reporting events is controlled through sending Events Descriptor by MGC.

In this solution, by the use of EventBuffer Descriptor and Events Descriptor, the above three rules can be met. If requiring an MG to detect and report some specific events, an MGC creates an Events Descriptor containing the specific events and sends the Events Descriptor to MG. A general Events Descriptor has a one-time report limit, i.e. events in the Events Descriptor are in a locked state (i.e. will not be used) after detected and reported. If requiring MG to detect and report another event, MGC has to send a new Events Descriptor. Once the events in the Events Descriptor are detected, MG reports the events to MGC through a command of Notify. Prior to receiving a response of Notify from MGC by MG, the command of Notify maintains in an unfinished state. In accordance with Rule 2, if a further event comes at this time, the event has to enter an EventBuffer for this termination to be buffered, until MG receives a response to the command of Notify from MGC. If there is an active Events Descriptor, MG continues to obtain events for report from the EventBuffer in accordance with a rule.

This solution can ensure serial transmission and execution of commands by adopting the EventBuffer mechanism, but the start of this mechanism with a high complexity in MG has to depend on the fact that MGC has to send a control in advance. However, in practical applications, it is necessary for only MG to ensure serial command report. In addition, if too many events are accumulated in the FIFO queue, the one-by-one detection and report manner will greatly reduce the interaction efficiency of commands between MG and MGC. In practical applications, many of these accumulated events are invalid events indeed. It causes rather serious trouble if the invalid events are reported to MGC, which results in the waste of time and the reduced processing efficiency. In an extreme case, this will badly affect the synchronization of termination state information between MG and MGC.

SUMMARY OF THE INVENTION

In view of this, a main object of the present invention is to provide a method for reporting events by a media gateway in a next generation network, to enable the media gateway to implement high-efficiency and serial event reporting.

To attain the above object, the present invention provides a method for reporting events by a media gateway in a next generation network, including:
executing a state machine which is established in a media gateway and includes service states driven by events, wherein the state machine comprises a state of Suspension,
wherein the executing process includes:
entering into the state of Suspension when an event is reported, if the state machine is in a state other than the state of Suspension; and
storing an event which can not be reported temporarily in an EventBuffer queue which is established in the media gateway, and returning to a state prior to the state of Suspension when the event reported is responded, if the state machine is in the state of to Suspension.

Preferably, the event which can not be reported temporarily is stored in the EventBuffer queue in a first in first out manner.

Preferably, the event is reported through a command of Notify.

Preferably, the executing process further includes:
Driving the state machine to execute state transition in response to a received event; and
Processing the event stored in the EventBuffer queue and continuing executing the state machine by the media gateway when the command of Notify is responded and the state machine quits the state of Suspension.

Preferably, the state machine is described in the form of directed graph representation.

The processing the event in the EventBuffer queue includes:
storing events which are on a shortest path computed from any initial state to any final state in the directed graph representation for indicating a shortest necessary event cluster from the initial state to the final state and processing events not on the shortest path based on predefined rules by the media gateway.

Preferably, the state machine is established with the following processes:

A1. classifying the events in accordance with a relation between service logic processing and the events;

A2. obtaining a state machine for processing the events corresponding to the service logic from a mechanism of events driving service state transition, based on the classification;

A3. revising the state machine by using an event processing rule specified in a protocol, and obtaining the state machine including service states driven by events.

Preferably, the events are classified into eigen-events and miscellaneous events, wherein the eigen-events affect the service state transition, and the miscellaneous events do not affect the service state transition;

The eigen-events are further classified into pure-state events and non-pure-state events, wherein the pure-state events only affect the service state transition, and the non-pure-state events carry information required for executing the service logic besides affecting the service state transition.

Preferably, the processing events not on the shortest path includes:

Removing pure-state events of the events not on the shortest path;

Reserving miscellaneous events of the events not on the shortest path, and processing the miscellaneous events based on a miscellaneous event rule of the predefined rules;

Reserving non-pure-state events not on the shortest path, and processing the non-pure-state events based on a non-pure-state event rule of the predefined rules.

Preferably, if the media gateway processes at least two services, the media gateway executes state machines corresponding to the at least two services respectively.

Preferably, if the media gateway processes at least two services,

The eigen-events obtained by classification affect at least one service state transition, the miscellaneous events do not affect any service state transition.

Preferably, the method further includes:

Storing by the media gateway event classes, the state machines, the directed graph representations, the shortest paths, the non-pure-state event rules and the miscellaneous event rules, which correspond to the service, as a profile, configuring the next generation network, and maintaining the profile.

Preferably, if the media gateway adds a new service, the method further includes:

classifying events corresponding to the new service respectively, establishing a state machine corresponding to the new service and other profile information, and updating relevant information in the profile;

executing by the media gateway the state machine corresponding to the new service.

Preferably, if the media gateway cancels a service, the method further includes:

Removing events and event classes corresponding to the service cancelled, removing the state machine corresponding to the service cancelled, and updating relevant information in the profile;

Ceasing executing the state machine corresponding to the service cancelled.

Preferably, if the media gateway changes the service logic, the method further includes:

Redefining the events and the event classes corresponding to the service, removing the state machine corresponding to the logic-changed service, removing relevant information in the profile; ceasing executing the state machine corresponding to the original service; for the changed service, reestablishing a state machine and other profile information, reestablishing a new profile corresponding to the logic-changed service; and executing by the media gateway the state machine corresponding to the logic-changed service to process events corresponding to the logic-changed service.

Preferably, if the media gateway possesses voice service, the eigen-events include: off-hook, hang-up, dialing, and flash-hook.

Preferably, if the media gateway possesses voice service, the pure-state events include: off-hook, hang-up, and flash-hook, and the non-pure-state events include dialing.

Preferably, the media gateway detects the event reported in accordance with an Events Descriptor;

The media gateway updates the Events Descriptor in accordance with a command sent by a media gateway controller.

Preferably, the media gateway communicates with the media gateway controller by using H.248 media gateway control protocol or media gateway control protocol.

An aspect of the present invention further provides a media gateway for reporting events in a next generation network, including:

a controller, adapted for executing a state machine which is established in the media gateway and includes service states driven by events, wherein the state machine comprises a state of Suspension; and an EventBuffer, adapted for storing an EventBuffer queue in which an event which can not be reported temporarily is stored;

wherein the state machine is executed with the processes of:

entering into the state of Suspension when an event is reported, if the state machine is in a state other than the state of Suspension; and returning to a state prior to the state of Suspension when the event reported is responded, if the state machine is in the state of Suspension.

Preferably, the event which can not be reported temporarily is stored in the EventBuffer queue in a first in first out manner.

Preferably, the event is reported through a command of Notify.

Preferably, the controller is further adapted for:

driving the state machine to execute state transition in response to a received event; and processing the event stored in the EventBuffer queue and continuing executing the state machine by the media gateway when the command of Notify is responded and the state machine quits the state of Suspension.

Preferably, the state machine is described in the form of directed graph representation.

In comparison, the technical solution of the present invention differs from the prior art in that the generalized method for reporting events by using the finite state machine mechanism in accordance with the relation between service and events. In addition, in combination with the rule for reporting events, the state of suspension and corresponding events are introduced into the state machine. On the precondition that there are a set of rules for media gateways in the prior art, by waiting for responses to the reported events and by using the method for buffering the reported events, the reported events can be executed sequentially.

On the basis of the directed graph representation of the state machine, the simplified method using the shortest path is adopted for processing buffered events, and invalid buffered events are removed on the precondition that the service is executed properly.

The miscellaneous events independent of state transition and non-pure-state events carrying extra information are specifically processed in accordance with a predetermined miscellaneous event rule and a non-pure-state event rule, and a system interface is provided for the device manager to flexibly define the rules for processing the miscellaneous events and the non-pure-state events as required.

In addition, in the general case that the media gateway processes multiple different services simultaneously, events, classes, state machines, etc. corresponding to various services are respectively established, the state machines corresponding to various services are respectively executed to process the corresponding events, and the profile is adopted to describe and maintain corresponding event classes and state machine information of the various services. In addition, corresponding processing methods are provided respectively for addition and cancellation of service classes and change of existing service logic.

The difference in technical solution brings significant technical effects, i.e. by introducing the state machine in the suspension mechanism and the EventBuffer mechanism, the generalized method for reporting events at the media gateway independently and conveniently ensures that the event reporting meets protocol rules and improves the adaptability and reliability of the system greatly.

Through the simplification of the shortest path based on the directed graph representation theory, the processing efficiency of reporting events is improved, the network bandwidth and resources are saved, and the synchronization between the media gateway and the media gateway controller is enhanced and the synchronization is an important precondition for normal operation in the next generation network.

Through the special processing of the miscellaneous events and non-pure-state events, the method for reporting events by using the state machine and the simplified method by using the shortest path can be executed effectively.

For the situations that multiple services are processed simultaneously, a new service is added, a service is cancelled or the existing service logic changes, the flexibility and extensibility of the system is enhanced, and the diversity development of network services is ensured and facilitated.

DETAILED DESCRIPTION OF THE INVENTION

Figure 1:
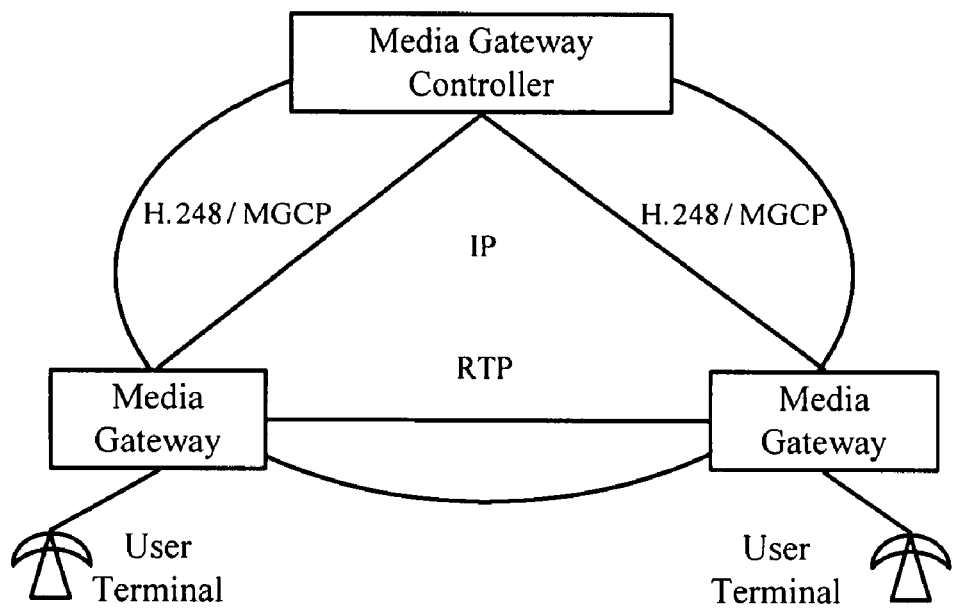
FIG. 1 is a schematic diagram illustrating the connection between functional entities in NGN.

For the purpose of making the object, technical solution and advantages of the present invention clearer, the present invention is described in detail with reference to the attached drawings.

In the present invention, a general method for reporting events by a media gateway is established by abstracting services, events and state machines. Firstly, the relation between various events and a service is described abstractly, to establish a state machine model driven by events of the service. A generalized description manner is established for the state machine model by revising the state machine in accordance with the above Rules 1, 2 and 3. A method of suspending a buffer queue is adopted to ensure the events are reported in sequence. Further, a directed graph representation theory is adopted to obtain a simplified shortest path-based processing method, which increases the processing efficiency, detects the validity of reported events and ensures the information synchronization between MG and MGC. The general method according to the present invention is based on a generalized description theory, and is adapted for any media gateway reporting events independent of protocols.

The present invention centers on service, and classifies all possible events detected by a termination into an eigen-event set and a miscellaneous event set. And a service state machine model is established in accordance with the relation between service states and event drive, thereby a generalized description theory is formed for illustrating the relation between the service and an eigen-event set of the service.

On the basis of the theory of service, event and state machine, the state machine is revised in accordance with the Rule 1 to Rule 3, to implement the general method for reporting events in combination with an EventBuffer mechanism. The method can implement a strict and appropriate sequence of event reporting and ensure the information synchronization between MG and MGC. A dedicated rule is defined for processing the miscellaneous events.

The simplified shortest path-based processing method is developed in accordance with the directed graph theory for the state machine. Particularly, a dedicated processing rule is defined for pure-state events and non-pure-state events, and the validity of the events is detected. Therefore, the efficiency of event processing is increased, the problem of reporting invalid events due to the accumulation of buffered events is completely avoided, and the reliability of the system is improved.

A flow of the method for reporting events by MG according to the first embodiment of the present invention may include the following three steps in general: classifying events in accordance with the relation between service processing and the events; establishing a state machine driven by the events in accordance with an event processing rule specified by a protocol; and processing the events by the media gateway by executing the state machine.

In the practical application, service logic of NGN is executed in accordance with the state machine. The execution begins with an initial state. If a new event comes, the state of the service transits to another state. The procedure of executing the service is indeed a procedure of state transition, which is driven by user-input events. Therefore, a Finite State Machine (abbreviated as FSM) may be adopted to describe the relation between states of the service and events of the service.

In the first embodiment of the present invention, a state machine is adopted to simulate the procedure of reporting events for each service in accordance with the relation between the service and the events. The service appears in various states. And state transition is driven by the events. The FSM for modeling may simplify the processing mechanism, in particular, the modeling may be represented by simple data structures and rules in the If-then form, which results in simple and convenient implementation. Furthermore, the FSM is a general description manner, based on which a generalized method for processing events can be established.

Further, in combination with the above Rule 1 to Rule 3 and the H.248 EventBuffer and reporting mechanism, the established and generalized method can appropriately ensure compliance with the rules, with a high processing efficiency and a high extensibility, and can support more complex multimedia services besides voice service.

Therefore, in the first step, the events are classified. In particular, the events are classified into eigen-events and miscellaneous events in accordance with effects on service states by the events. The eigen-events are those events affecting the service state transition. The miscellaneous events are those events which do not affect the service state transition and those random and burst events. The miscellaneous events may be processed at any moment. In various services of NGN, each service has its event set in accordance with the relation between events and the service. For example, for voice service, the above-mentioned four typical events (off-hook, hang-up, dialing, and flash-hook) are eigen-events of the service. With the development of diversification of NGN services, particularly the appearance of various multimedia services, different services will produce multiple new events associated with these services. For example, in videophone service, besides the above four events, there may be events such as video selection, video disabled, request to speak, request for chair and sending text.

For convenience, it is supposed that all of the M events possibly detected at a type of termination (i.e. a certain service) are presented as a set, AllEvents=$\{E_1, E_2, E_3, \ldots, E_M\}$. The set includes: an Eigen-Event Set (abbreviated as EES) $\{E^{EG}_1, E^{EG}_2, E^{EG}_3, \ldots, E^{EG}_Q\}$ consisting of Q eigen-events, and a miscellaneous event set (MisEvents) consisting of M-Q miscellaneous events. And a service state set (including N states) is represented as SVCST=$\{S_0, S_1, S_2, \ldots, S_{N-1}\}$. For example, for the voice service, its EES=$\{O,F,D,H\}$, its service state set SVCST=$\{S_0, S_1, S_2\}$. The O, F, D, H stands for four events identified by the first letter in their names. Respectively, the state $S_0$ indicates not off-hook, $S_1$ indicates off-hook but not dialing, $S_2$ indicates dialing.

Figure 2:
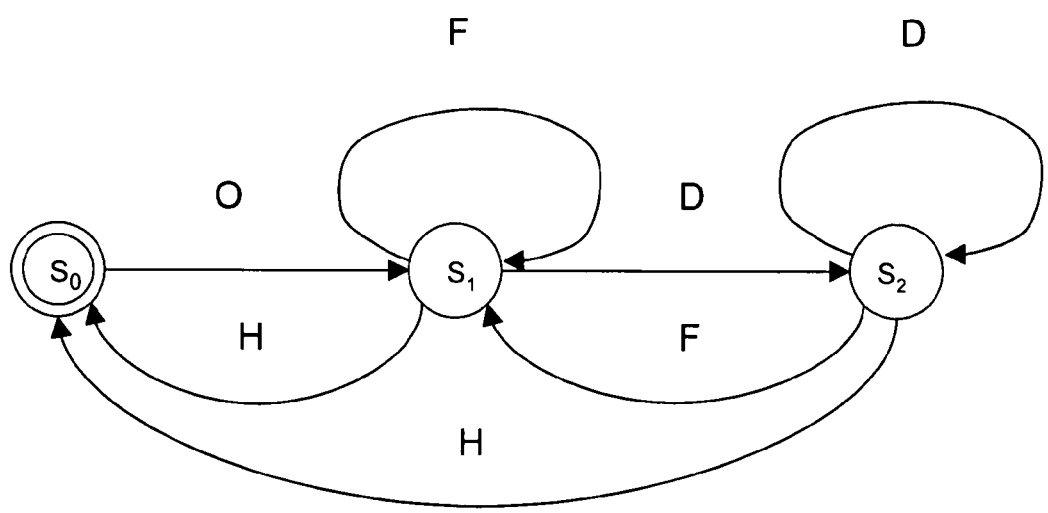
FIG. 2 is a schematic diagram of a service logic state machine of voice service.

In the second step of the first embodiment of the present invention, a state machine is established for reporting events after the events and states are analyzed and defined. Firstly, it needs to obtain a state machine for the service logic processing the events. The state machine for executing the service logic may be deduced from eigen-events and the logical relation of the eigen-events. For example, the state machine model of the voice service is illustrated in FIG. 2. In the FIG. 2, state $S_0$ is indicated by a double-decker circle. On the basis of the state machine of the service logic, the state machine is revised in accordance with Rules 1-3, for meeting the rule of serially executing the events.

In the cooperation of MGC and MG, MG firstly detects user-input events occurred at a specified termination, then reports the events to MGC for processing through a command of Notify. In accordance with Rule 1, Rule 2 and Rule 3, the event reporting performed by MG should be in a serial and sequential manner. However, because the transmission between MG and MGC is unreliable or the rate of reporting by MG is inconsistent with the processing rate of MGC, the rules may be destroyed. Therefore, in the first embodiment of the present invention, an EventBuffer queue is adopted for buffering those events that can not be reported temporarily. Besides, for ensuring that the reported events are executed serially at MGC, subsequent events should be reported after all responses to previous events have been obtained. Therefore, in the first embodiment of the present invention, a special state of "Suspension" is added in the state machine, for awaiting a response to the command of Notify. In other words, the procedure enters into the state of "Suspension" immediately after the command of Notify is sent; until a response is received, the procedure returns to the state prior to "Suspension", and continues with the processing of the events.

Figure 3:
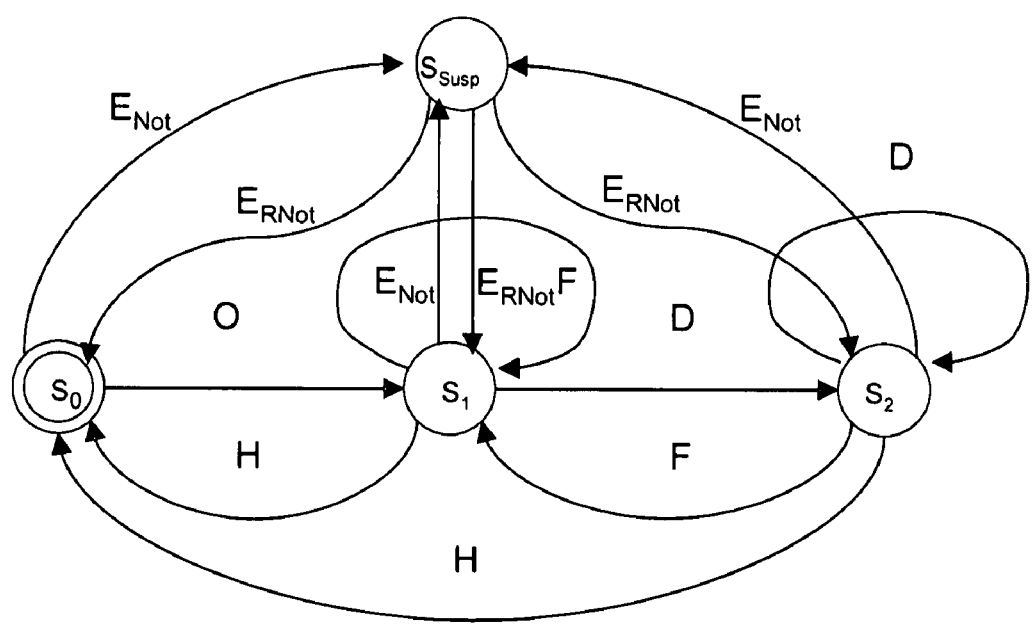
FIG. 3 is a schematic diagram illustrating a state machine of event reporting for voice service according to a first embodiment of the present invention.

On the basis of the state machine of the service logic, the state of "Suspension" $S_{Susp}$, a corresponding event $E_{Not}$, and an event $E_{RNot}$ is introduced. Particularly, $E_{Not}$ corresponds to the event of sending the command of Notify, and $E_{RNot}$ corresponds to the event of obtaining the response to the command of Notify. Therefore, a desirable state machine is obtained. FIG. 3 illustrates a schematic diagram illustrating a state machine for reporting events for voice service in a buffering manner in accordance with Rule 1 to Rule 3. It can be seen that MG can control the serial reporting of events independently through adding the state of Suspension and the EventBuffer queue, which features convenient implementation and general models independent of protocols and services.

Finally, in the third step of the first embodiment of the present invention, the state machine established in the step 2 is executed at MG for reporting the events. Because the miscellaneous events do not affect the state transition, a dedicated miscellaneous event rule is predefined, in accordance with which the miscellaneous events are processed.

For further improving the processing efficiency of reporting events and preventing information from being asynchronous, in the second embodiment of the present invention a method of processing the EventBuffer queue is implemented in accordance with a graph theory and a shortest path theory, to improve the processing efficiency of reporting events. Firstly, the state machine model is abstracted as a directed graph representation in the graph theory. The directed graph representation consists of vertexes and directed arcs. The states in the state machine are represented as vertexes, and the events are represented as arcs, thereby the state machine model can be abstracted as a directed graph representation.

In accordance with the characteristics of the state machine, i.e. all states are reachable to each other, a state can reach any other state through finite transition, so the corresponding directed graph representation is connected. In accordance with the path theory in the directed graph representation, in the connected graph representation, it is certain that there exists at least one path between any two vertexes $S_i$ and $S_j$, i.e. a path from $S_i$ to $S_j$. The path consists of several arcs, i.e. an event cluster. For example, in voice service, a path existing between states $S_0$ and $S_2$ is an event cluster O, D, which means that the state of not off-hook may transit to the state of dialing through two events of O and D. If there exist multiple paths between $S_i$ and $S_j$, it is certain that there exists a shortest path, which contains a minimum number of arcs (events), i.e. there are a minimum number of transitions from $S_i$ to $S_j$. In accordance with the directed graph theory, the shortest path of SPath($S_i$,$S_j$) can be computed between any pair of vertexes (between $S_i$ and $S_j$) in the connected directed graph representation.

Therefore, in the directed graph representation corresponding to the state machine, the second embodiment of the present invention defines the shortest path of SPath($S_i$,$S_j$), which means a path (i.e. an event cluster) passing through a minimum number of events inevitably from the initial state of $S_i$ to the final state of $S_j$. In other words, any possible event cluster from the state of $S_i$ to the state of $S_j$ is longer than and contains a sub-cluster completely matched with the shortest path of SPath($S_i$,$S_j$). Therefore, the following two situations should be further considered: the state of $S_i$ transits to the state of $S_j$ through an event cluster, and the state of $S_i$ transits to the state of $S_j$ through the shortest path of SPath($S_i,S_j$) directly. It is certain that the former needs more events than the shortest path of SPath($S_i,S_j$) does. If all events in the event cluster only affect the state transition, the two situations bring the same effect. For example, in voice service, through the drive of the input events of O,D,F, the state $S_0$ of not off-hook transits to the state of $S_1$, then to $S_2$, and then back to $S_1$, with the same effect as that the state of $S_0$ transits to the state of $S_1$ along with the shortest path of SPath($S_0,S_1$)=O. Accordingly, the second embodiment of the present invention achieves the object of highly-effective processing of reporting events through simplifying the whole buffered event cluster by using the shortest sub-cluster in the buffered events.

It should be noted that the precondition for meeting the simplification of the buffered cluster by using the shortest path is that all events only affect state transition. With respect to the eigen-events, some of which are only adapted to drive service state transition, others carry information in themselves besides affecting state transition. Taking the events of dialing as an example, when a number is dialed, the original number is increased by one bit. The number is the information required by the service logic. Therefore, the second embodiment of the present invention classifies the eigen-events into Pure-State Events (abbreviated as "PSE") and Non-Pure-State Events (abbreviated as "NPSE"). The pure-state events only affect service state transition and the non-pure-state events carry information required for executing the service logic besides affecting state transition. The pure-state events in the EventBuffer queue can be simplified through the shortest path. However, the non-pure-state events should be processed through a dedicatedly defined non-pure-state rule.

After the state machine becomes the original state from the state of Suspension, the current state is $S_i$. While, the event cluster of $BE_1, BE_2, \ldots, BE_L$ buffered in the EventBuffer contains L events. If the L events are sequentially applied to the state machine, the state could be driven to transit to the destination state of $S_j$. It can be seen that the event cluster in the EventBuffer queue forms a path from the current state of $S_i$ to the destination state of $S_j$. This path contains the shortest path of SPath($S_i,S_j$). In the second embodiment of the present invention, the EventBuffer queue is scanned to obtain the shortest path. Those events on the shortest path are reserved. If the events that are not on the shortest path are pure-state events, the events are removed. If the events that are not on the shortest path are non-pure-state events, the events are processed in accordance with the predefined non-pure-state event rule.

For example, in voice service, the state machine is in the state of off-hook prior to the state of Suspension. During the suspension, the user inputs events of dialing successively, then the user finds that the dialed number is wrong later and inputs an event of flash-hook. In this case, the state machine turns back from the state of Suspension and ultimately reaches the state of off-hook. Then, the shortest path between a state and itself is null, and both the events of dialing and flash-hook are not on the shortest path. The event of flash-hook is a pure-state event and can be removed. However, the event of dialing is a non-pure-state event, which is processed in accordance with a corresponding processing rule. For example, for the events of dialing in voice service, the non-pure-state event rule may be defined as follows.

Step 1. If the destination state is the state $S_2$ of dialing and the ultimate event in the EventBuffer is the event of dialing D, the procedure goes to Step 2; otherwise, the procedure goes to Step 4;

Step 2. In the EventBuffer, the events are scanned sequentially from the tail to the head of the EventBuffer. If a scanned event is an event of dialing D, the scan continues. Otherwise, the scan is ceased, and the procedure goes to Step 3;

Step 3. If a segment of currently scanned event cluster is inevitably a cluster of successive events of dialing D, the event cluster is reserved, and the procedure ends.

Step 4: All the events of dialing are removed from the EventBuffer.

Therefore, invalid events are removed through the method of simplifying the buffered event cluster by using the shortest path and the method of processing events based on the non-pure-state rule. Not only the accuracy of processed result of reported events is ensured, but also processing resources and network bandwidth of MGC are saved, and it can be avoided that the information synchronization is destroyed due to a vicious circle.

It can be easily appreciated from the above, the general processing method according to the present invention is based on a generalized theory, and adapted for reporting events by any media gateway independent of protocol. This method is adapted for H.248, MGCP or any communication and control protocol between MGC and MG possibly emerged in future, thereby having a generality.

Figure 4:
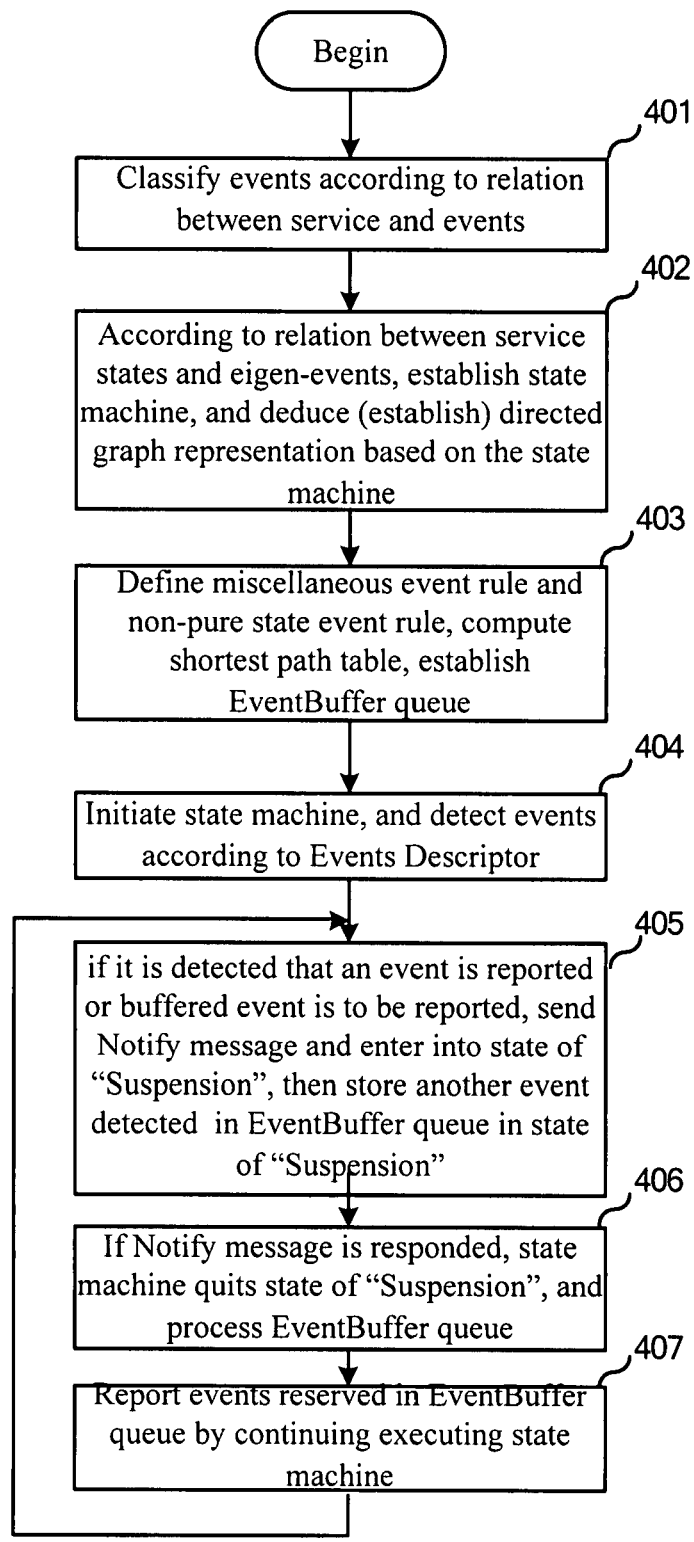
FIG. 4 is a flowchart of a method for reporting events according to a third embodiment of the present invention.

For specifically describing the method of reporting events according to the present invention, FIG. 4 shows a whole flowchart of reporting events according to a third embodiment of the present invention.

First in step 401, the relation between a service and events in NGN is analyzed, and the events are classified. All events of AllEvents=$\{E_1, E_2, E_3, \ldots, E_M\}$ are classified into eigen-events of EES=$\{E^{EG}_1, E^{EG}_2, E^{EG}_3, \ldots, E^{EG}_Q\}$ and miscellaneous events of MisEvents=$\{ME_1, ME_2, ME_3 \ldots, ME_{MMis}\}$ in accordance with whether an event drives service state transition. Further, the eigen-events are classified into pure-state events and non-pure-state events in accordance with whether an eigen-event carries information besides the eigen-event drives state transition.

Next, the procedure goes to step 402, in which a state machine model is established in accordance with Rules 1-3 and the drive relation between service states and eigen-events, a directed graph representation is deduced (established) based on the state machine model, and further internal representation in a computer (of the directed graph representation) is formed. In practical implementation, all service states of SVCST=$\{S_0, S_1, S_2, \ldots, S_{N-1}\}$ are first listed as states of the state machine; then in accordance with event driving relation plus the eigen-events, a state of $S_{Susp}$ of Suspension, a corresponding event of $E_{Not}$, and an event of $E_{RNot}$ are introduced. Particularly, $E_{Not}$ corresponds to the event of sending the command of Notify, and $E_{RNot}$ corresponds to the event of obtaining the response to the command of Notify. Through the method of the state machine corresponding to vertexes and directed arcs directly corresponding to events, the directed graph representation can be obtained based on the state machine. The directed graph representation may be expressed in various manners in a computer, e.g. data structures such as a three-dimensional array and a chain table.

Then the procedure goes to step 403, in which other configuration is accomplished, including definition of a miscellaneous event rule and of a non-pure-state event rule, computation of a shortest path between any two vertexes in the directed graph representation, and setting of an EventBuffer queue in MG The rules for processing various miscellaneous events or non-pure-state events should be defined in accordance with specific service settings and processing logic. The manner of definition is a series of If-then rules. And, the internal representation in a computer is established for the rules. The rules for processing all miscellaneous events and non-pure-state events are defined separately. Then the shortest path between any two states is computed by adopting the shortest path algorithm of the graph theory, to obtain a shortest path table. Each path in the table is indeed an event cluster consisting of several eigen-events. And, internal representation in a computer is generated, such as a two-dimensional array and a chain table.

Then, the procedure goes to step 404, in which the MG initiates the state machine to detect events in accordance with an Events Descriptor, and the events drive state transition for reporting events. Particularly, after the NGN service logic is initiated, the state machine is initiated. In this case, MGC sends an Events Descriptor specifying a legal eigen-event set to MG in accordance with the service logic. MG detects and reports events in accordance with the received the Events Descriptor, performs state transition in response to the drive of events. In particular, after the service logic is initiated, the state machine in MG is driven by events from the initial state. Further, during the procedure of reporting events, MG performs update in accordance with the Events Descriptor sent from MGC.

In step 405, if it is detected that an event is to be reported or a buffered event is to be reported, a message of Notify (containing information on this event) is sent, so as to trigger the event of $E_{Not}$, so that the state machine enters into the state of Suspension. In the state of Suspension, if another event is detected, the another event is buffered in the EventBuffer queue in accordance with FIFO rule.

In step 406, if the Notify message is responded, the state machine goes back to the previous state from the state of Suspension, and the EventBuffer queue is processed in accordance with the following rule.

1) Detect the events buffered in the EventBuffer queue (finding that there are L events of $BE_1, BE_2, \ldots, BE_L$), deduce the destination state of $S_q$ of the event cluster started from the current state of $S_p$, and search in the shortest path table for the shortest path of $SPath(S_p, S_q)$.

2) Scan the EventBuffer to obtain an event cluster of Matched Shortest Path (abbreviated as "MSP"), which is completely matched with $SPath(S_p, S_q)$.

3) Determine the events in the EventBuffer as follows: a) if the events are on the MSP, reserve the events; b) if the events are not on the MSP and are pure-state events, remove the events; c) if the events are not on the MSP and are non-pure-state events, process the events in accordance with the non-pure-state event rule for the non-pure-state eigen-events, i.e. reserve or remove the events; d) if the events are miscellaneous events, process the events in accordance with the miscellaneous event rule for the miscellaneous events, i.e. reserve or remove the events.

Finally in step 407, it is detected that whether there is any Events Descriptor in an active state after all buffered events in the EventBuffer have been processed; if there is any Events Descriptor and the events reserved in the EventBuffer meet the condition of the Events Descriptor, the procedure returns to step 405, i.e. the event is reported through the command of Notify, and the state machine enters into the state of Suspension, then the reported events continue to be processed.

The three above-mentioned embodiments describe detailed technical solution and implementing details of an MG processing a service separately. However, with the diversification development of NGN services, especially the emergence of multiple kinds of multimedia services, a different service generates many new events associated with the service. For example, in videophone service, besides the above four events, there may be events such as video selection, video disabled, request to speak, request for chair and sending text. In other words, for better supporting the diversification development of services, the method for simultaneously reporting events from multiple services and its relevant technical solution are proposed.

In the fourth embodiment of the present invention, all services and various service types processed by MG are processed as follows: classify service-associated events, establish a state machine in accordance with the service logic, and execute their own state machines to process the respective events.

First, in this manner, events corresponding to various services are classified respectively. The service and service-associated events may be combined. Therefore, various service-associated events may be put into event sets of the various services. It is first assumed that there are K services, which constitute a service set, represented as AllServices=$\{SVC_1, SVC_2, SVC_3, \ldots, SVC_K\}$. Similarly, each service has one EES (a superscript of i is used for distinguishing the event set of the $i^{th}$ service): $EES_i = \{E^{(i)}_1, E^{(i)}_2, E^{(i)}_3, \ldots, E^{(i)}_{M_i-1}\}$ corresponding to M events. Each service has also its own state set: $SVCST_i = \{S^{(i)}_0, S^{(i)}_1, S^{(i)}_2, \ldots, S^{(i)}_{N_i-1}\}$ consisting of $N_i$ different states. In each service, the conditions between its event set and its state set are the same as the above, which is not described here.

It should be noted that the definition of miscellaneous events may be identical, i.e. the miscellaneous events are not associated with all services. Therefore, AllEvents should include $EES_1, EES_2, EES_3, \ldots, EES_K$, and MisEvents. Here, the classification and definition of events and services are made for the situation where multiple services coexist. Similarly, relevant events of each service are classified into pure-state events and non-pure-state events, and a corresponding rule for processing non-pure-state events is defined. In addition, similarly, miscellaneous events are processed specially in accordance with a miscellaneous event rule, which should be met by the state machine of any service.

Second, for each service and its state set, a state machine is established and a graph representation of the state machine is generated. The state machine is deduced from eigen-events and logic of the eigen-events. As being similar with the above, the state machine is represented and stored as a directed graph representation. And, a shortest path is computed between any two states in each service state graph. For example, the shortest path between the $m^{th}$ state and the $n^{th}$ state in the state set of the $i^{th}$ service of $SVC_i$ is computed as $SPath(S^{(i)}_m, S^{(i)}_n)$. Therefore, the shortest path is indeed a three-dimensional table, with one of the dimensions representing service type.

Then, corresponding state machines should be executed for various services respectively in MG, to process the reported events. In particular, with respect to the $i^{th}$ service of $SVC_i$, the service logic is initiated; the state machine is initiated from the initial state of $S^{(i)}_0$; MGC continuously sends an Events Descriptor containing some specific events in accordance with the service logic; MG receives the Events Descriptor, and the Events Descriptor is in an active state. The special consideration for state transition and processing of various events is identical with that of the above embodiments.

Figure 5:
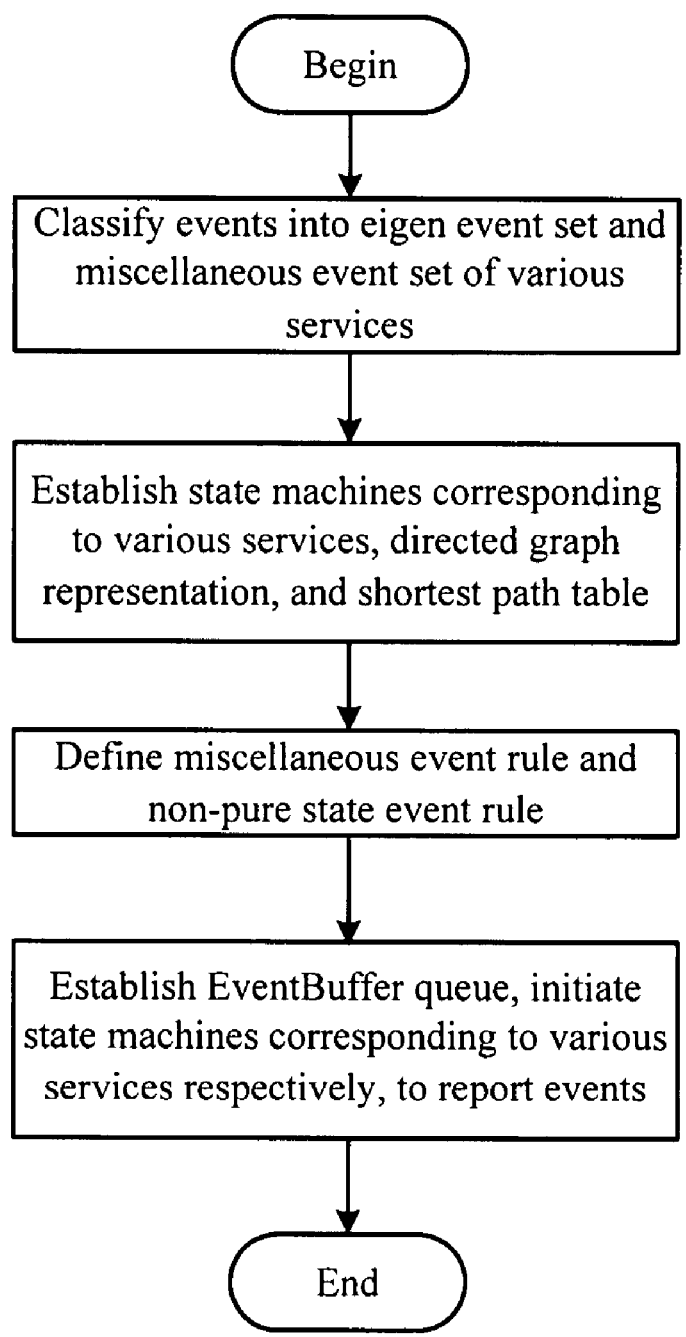
FIG. 5 is a flowchart of a method for reporting events according to a fourth embodiment of the present invention.

The procedure as illustrated in FIG. 5 summarizes the situations where multiple services are processed simultaneously.

It should be noted here that for the situations where multiple services are processed simultaneously confronted by a processor entity, the present invention achieves to simultaneously and respectively execute multiple service state machines by implementing a multiple task execution mechanism. In addition, necessary coordination is performed among the procedures and existing matured mechanisms are adopted, so as to avoid the occurrence of abnormal situations such as competition conditions.

In addition, the present invention adopts a data configuration method to configure the whole system, so that the whole system can run in an interoperable way. Moreover, the method can enable convenient storage, description, maintenance and update of multiple services, multiple events, multiple states and multiple rules. Therefore, results generated from the above steps, such as configuration information on event classification set, information on state graph and shortest path, and information on processing rules, should be stored in corresponding profile as data and rules that can be generated dynamically, and configured into the NGN system. The profile is adapted for system storage and maintenance, and is updated when the system setting changes.

The issues of change of kinds of services and dynamic maintenance can be associated with the technical solution of processing multiple services. During the development of NGN, it is possible to emerge a situation of dynamically adjusting kinds of services, e.g. adding newly developed kinds of services and canceling old kinds of services. In these cases, it is needed to update the system configuration, including event set, classifying solution, state machine involved in the above procedure of reporting events, etc.

Therefore, in the fourth embodiment of the present invention, if a new service is added at MG, the above steps are executed for the newly added service, events corresponding to the newly added service are classified respectively, an eigen-event set is set, a corresponding state machine is established in accordance with the service logic, and relevant information in the profile is updated; then MG executes the state machine corresponding to the newly added service to process the eigen-events corresponding to the newly added service. If canceling a service, MG removes events and classification information corresponding to the service to be canceled, removes state machine information corresponding to the service to be canceled, updates relevant information in the profile, and ceases operating the state machine.

The above steps are repeated in accordance with new parameters. After the new service appears, an FSM model corresponding to the new service and relevant events is defined, which is then converted into data structure and rule system in the corresponding form, which can be understood by computer, thereby enabling MGC and MG to support this new service and relevant events through configuration of NGN. Also, configuration information can be generated by analyzing and modeling the relation between the newly added service and newly added events. Then NGN is updated with the corresponding configuration, thereby the new service can be supported. Therefore, the flexibility and extensibility of the system are improved greatly.

It is appreciated to those skilled in the art that the above method for reporting events is a general method, which may be applied to communication protocols (e.g. MGCP) between MGC and MG other than H.248, to achieve the object of effectively reporting events within the scope of the present invention.

The present invention is illustrated and described with reference to some preferred embodiments of the present invention. Those skilled in the art should appreciate that various modifications may be made in form and details within the scope of the present invention.

The invention claimed is:

1. A method for reporting events by a media gateway to a media gateway controller in a network, comprising:

executing a state machine which is established in the media gateway and includes service states driven by events, wherein the state machine comprises a state of Suspension, and the state machine is established with the following process:
  A1. classifying the events in accordance with a relation between service logic processing and the events;
  A2. obtaining a state machine for processing the events corresponding to the service logic from a mechanism of events driving service state transition, based on the classification;
  A3. revising the state machine by using an event processing rule specified in a protocol, and obtaining the state machine including service states driven by events;
wherein the executing process comprises:
  entering into the state of Suspension when an event is reported to the media gateway controller, if the state machine is in a state other than the state of Suspension; and
  storing an event which can not be reported temporarily to the media gateway controller in an EventBuffer queue which is established in the media gateway, and returning to a state prior to the state of Suspension when the event reported is responded, if the state machine is in the state of Suspension; and
wherein the method further comprises:
  detecting the event reported in accordance with an Events Descriptor; and
  updating the Events Descriptor in accordance with a command sent by the media gateway controller.

2. The method according to claim 1, wherein the event which can not be reported temporarily is stored in the EventBuffer queue in a first in first out manner.

3. The method according to claim 1, wherein the event is reported through a command of Notify.

4. The method according to claim 3, wherein the executing process further comprises:
  driving the state machine to execute state transition in response to a received event; and
  processing the event stored in the EventBuffer queue and continuing executing the state machine by the media gateway when the command of Notify is responded and the state machine quits the state of Suspension.

5. The method according to claim 4, wherein the state machine is described in the form of directed graph representation.

6. The method according to claim 5, wherein the processing the event in the EventBuffer queue comprises:
  storing events which are on a shortest path computed from any initial state to any final state in the directed graph representation for indicating a shortest necessary event cluster from the initial state to the final state and processing events not on the shortest path based on predefined rules by the media gateway.

7. The method according to claim 1, wherein the events are classified into eigen-events and miscellaneous events, wherein the eigen-events affect the service state transition, and the miscellaneous events do not affect the service state transition.

8. The method according to claim 7, wherein the eigen-events are further classified into pure-state events and non-pure-state events, wherein the pure-state events only affect the service state transition, and the non-pure-state events carry information required for executing the service logic besides affecting the service state transition.

9. The method according to claim 8, wherein the processing events not on the shortest path comprises:
   removing pure-state events of the events not on the shortest path;
   reserving miscellaneous events of the events not on the shortest path, and processing the miscellaneous events based on a miscellaneous event rule of the predefined rules; and
   reserving non-pure-state events not on the shortest path, and processing the non-pure-state events based on a non-pure-state event rule of the predefined rules.

10. The method according to claim 1, wherein if the media gateway processes at least two services,
   the media gateway executes state machines corresponding to the at least two services respectively.

11. The method according to claim 7, wherein if the media gateway processes at least two services,
   the eigen-events obtained by classification affect at least one service state transition, the miscellaneous events do not affect any service state transition.

12. The method according to claim 8, further comprising:
   storing by the media gateway event classes, the state machines, the directed graph representations, the shortest paths, the non-pure-state event rules and the miscellaneous event rules, which correspond to the service, as a profile, configuring the next generation network, and maintaining the profile.

13. The method according to claim 12, wherein if the media gateway adds a new service, the method further comprises:
   classifying events corresponding to the new service respectively, establishing a state machine corresponding to the new service and other profile information, and updating relevant information in the profile; and
   executing by the media gateway the state machine corresponding to the new service.

14. The method according to claim 12, wherein if the media gateway cancels a service, the method further comprises:
   removing events and event classes corresponding to the service cancelled, removing the state machine corresponding to the service cancelled, and updating relevant information in the profile; and
   ceasing executing the state machine corresponding to the service cancelled.

15. The method according to claim 12, wherein if the media gateway changes the service logic, the method further comprises:
   redefining the events and the event classes corresponding to the service, removing the state machine corresponding to the logic-changed service, removing relevant information in the profile;
   ceasing executing the state machine corresponding to the original service;
   for the changed service, reestablishing a state machine and other profile information, reestablishing a new profile corresponding to the logic-changed service; and
   executing by the media gateway the state machine corresponding to the logic-changed service to process events corresponding to the logic-changed service.

16. The method according to claim 7, wherein if the media gateway possesses voice service, the eigen-events comprise: off-hook, hang-up, dialing, and flash-hook.

17. The method according to claim 8, wherein if the media gateway possesses voice service, the pure-state events comprise: off-hook, hang-up, and flash-hook, and the non-pure-state events comprise dialing.

18. The method according to claim 1, wherein the media gateway communicates with the media gateway controller by using H.248 media gateway control protocol or media gateway control protocol.

19. A media gateway for reporting events to a media gateway controller in a network, comprising:
   a controller for executing a state machine which is established in the media gateway and includes service states driven by events, wherein the state machine comprises a state of Suspension, and the state machine is established with the following process:
      A1. classifying the events in accordance with a relation between service logic processing and the events;
      A2. obtaining a state machine for processing the events corresponding to the service logic from a mechanism of events driving service state transition, based on the classification;
      A3. revising the state machine by using an event processing rule specified in a protocol, and obtaining the state machine including service states driven by events; and
   an Event Buffer, adapted for storing an EventBuffer queue in which an event which can not be reported temporarily to the media gateway controller is stored;
   wherein the state machine is executed with the processes of:
      entering into the state of Suspension when an event is reported to the media gateway controller, if the state machine is in a state other than the state of Suspension; and
      returning to a state prior to the state of Suspension when the event reported is responded, if the state machine is in the state of Suspension; and
   wherein the controller is further configured to:
      detect the event reported in accordance with an Events Descriptor;
      and update the Events Descriptor in accordance with a command sent by the media gateway controller.

20. The media gateway according to claim 19, wherein the event which can not be reported temporarily is stored in the EventBuffer queue in a first in first out manner.

21. The media gateway according to claim 19, wherein the event is reported through a command of Notify.

22. The media gateway according to claim 21, wherein the controller is further configured to:
   drive the state machine to execute state transition in response to a received event; and
   process the event stored in the EventBuffer queue and continue executing the state machine by the media gateway when the command of Notify is responded and the state machine quits the state of Suspension.

23. The media gateway according to claim 22, wherein the state machine is described in the form of directed graph representation.

* * * * *

UNITED STATES PATENT AND TRADEMARK OFFICE
CERTIFICATE OF CORRECTION

PATENT NO. : 7,920,582 B2
APPLICATION NO. : 11/976034
DATED : April 5, 2011
INVENTOR(S) : Zhong Luo It is certified that error appears in the above-identified patent and that said Letters Patent is hereby corrected as shown below:

In claim 19, column 18, line 26, "an Event Buffer, adapted for" should read -- an Event Buffer for --

Signed and Sealed this
Nineteenth Day of March, 2013

Teresa Stanek Rea
*Acting Director of the United States Patent and Trademark Office*